(12) United States Patent
Price et al.

(10) Patent No.: US 6,560,075 B2
(45) Date of Patent: May 6, 2003

(54) DISK DRIVE WITH MULTIPLE ACTUATORS AND REDUCED ACTUATOR INTERACTIONS

(75) Inventors: Kirk Barrows Price, San Jose, CA (US); Ta-Chang Fu, San Jose, CA (US); Anthony George Dunn, San Jose, CA (US)

(73) Assignee: Hitachi Global Storage Technologies, Amsterdam (NL)

( * ) Notice: Subject to any disclaimer, the term of this patent is extended or adjusted under 35 U.S.C. 154(b) by 96 days.

(21) Appl. No.: 09/835,918

(22) Filed: Apr. 10, 2001

(65) Prior Publication Data

US 2002/0149884 A1 Oct. 17, 2002

(51) Int. Cl.$^7$ .............................. G11B 5/55; G11B 5/48; G11B 21/08; G11B 21/16
(52) U.S. Cl. ................. 360/264.3; 360/246.7; 360/264.2; 360/264.4
(58) Field of Search ............. 360/264.3, 264.4, 360/264.5, 265.2, 246.7

(56) References Cited

U.S. PATENT DOCUMENTS

| | | | |
|---|---|---|---|
| 4,544,972 A | 10/1985 | Kogure et al. | 360/105 |
| 5,134,532 A | 7/1992 | Svendsen et al. | 360/106 |
| 5,343,347 A * | 8/1994 | Gilovich | 360/246.7 |
| 5,761,007 A | 6/1998 | Price et al. | 360/106 |
| 5,805,386 A | 9/1998 | Faris | 360/106 |
| 5,914,837 A | 6/1999 | Edwards et al. | 360/106 |
| 5,930,071 A | 7/1999 | Back | 360/97.01 |
| 5,983,485 A * | 11/1999 | Misso | 29/603.03 |
| 6,005,743 A | 12/1999 | Price et al. | 360/78.12 |
| 6,064,550 A * | 5/2000 | Koganezawa | 360/294.3 |
| 6,449,130 B1 * | 9/2002 | Koyama | 360/264.4 |
| 2002/0060885 A1 * | 5/2002 | Money | 360/264.4 |

FOREIGN PATENT DOCUMENTS

| | | | | |
|---|---|---|---|---|
| JP | 56068966 A | * | 6/1981 | G11B/21/16 |
| JP | 58062867 A | * | 4/1983 | G11B/21/04 |
| JP | 02206076 A | * | 8/1990 | G11B/21/08 |

OTHER PUBLICATIONS

Research Disclosure No. 430135, *Integrated Magnet/Pole Piece Assembly*, Feb. 2000, No. 135, p. 349.
IBM Technical Disclosure Bulletin, *Head Load/Unload Mechanism*, Jul. 1988, pp. 231–233.

* cited by examiner

Primary Examiner—William Klimowicz
(74) Attorney, Agent, or Firm—Lewis L. Nunnelley (57) ABSTRACT

A multiple actuator disk drive is disclosed. The mechanical vibration in one actuator induced by motion in the second actuator is greatly reduced by providing an independent bearing shaft for each actuator. The bearing shafts are mounted substantially along the same geometric axis.

4 Claims, 8 Drawing Sheets

DISK DRIVE WITH MULTIPLE ACTUATORS AND REDUCED ACTUATOR INTERACTIONS

BACKGROUND OF THE INVENTION

1. Field of the Invention

This invention relates to a magnetic disk drive having multiple rotary actuators; and, more particularly, to multiple actuators with reduced interactions.

2. Description of the Background Art

Disk drives using magnetic recording of digital information comprise most of the information storage in contemporary computer systems. Specific disk drives have been developed for applications ranging from small low power drives for mobile computers to high performance drives for large net-based server applications. Disk drives have at least one rotating disk with discrete concentric tracks of data. There is at least one recording head typically comprising a separate write element and read element for writing and reading the data on the tracks. The recording head is attached to a slider and the slider is attached to a suspension. The combination of the recording head, slider and suspension is called a head gimbal assembly. In addition, there is an actuator which positions the recording head on the specific track of interest. The actuator first rotates to seek the track of interest and after positioning the recording head over that track maintains the recording head in close registration to that track.

The actuators for the vast majority of disk drives utilize a rotary structure. The rotary structure comprises a rigid support member. This support member has arms for attachment to the head gimbal assemblies. This rigid support member has an axis of rotation the location of which is defined by the position of a bearing shaft. The support member has coils generally across the center of rotation from the head gimbal assemblies. These coils in conjunction with magnets placed in close proximity to them form a voice coil motor (VCM) which is used to rotate the actuator about the bearing shaft.

High performance disk drives can have two or more separate actuators mounted on a common bearing shaft. This approach has the advantage that parallel streams of data can be simultaneously processed though the recording heads on each actuator. Alternatively while one actuator is in place and the recording head on that actuator is active processing data, the other actuator can be moving to the next track of interest. This can minimize the apparent seek time of the actuator during which data cannot not be processed by the recording head.

One problem associated with multiple actuator assemblies is that the movement of one actuator induces movement or vibrations in the other actuator. Thus if one actuator is moving while the second actuator has positioned the recording head and that head is active in processing data, then the function of the recording head is compromised by vibrations caused by the first actuator. There have been attempts in the past to dampen vibrations in actuators by placing a rubber like material between the bearing shaft and the actuator. One limitation in this approach is that rigidity is sacrificed thereby degrading actuator performance. Another limitation is that many rubber like or elastomer materials tend to outgas causing contamination problems within the disk drive. Yet another limitation for elastomer materials is the tendency to creep causing longer term dimensional instability.

What is needed is a dual actuator structure which is less prone to couple vibrations from the movement of one actuator into the second actuator.

SUMMARY OF THE INVENTION

What is disclosed is a disk drive having two or more actuators wherein the actuators share a common geometrical rotation axis but are mounted on separate bearing shafts. Separate bearing shafts result in much less mechanical coupling between the actuators compared to a single common bearing shaft.

In one embodiment, the ends of the bearing shafts are mounted on an extension or attachment portion of the centrally located magnet mounting plate which supports some of the magnets of the VCM. The plate extension can be slotted for additional vibration isolation. Alternatively two separate central plates can be used for greater vibration isolation. Additionally, damping material can be used between the two plates.

In another embodiment, the separate bearing shafts are mounted independently from the magnet mounting plates.

DETAILED DESCRIPTION OF THE INVENTION

Figure 1:
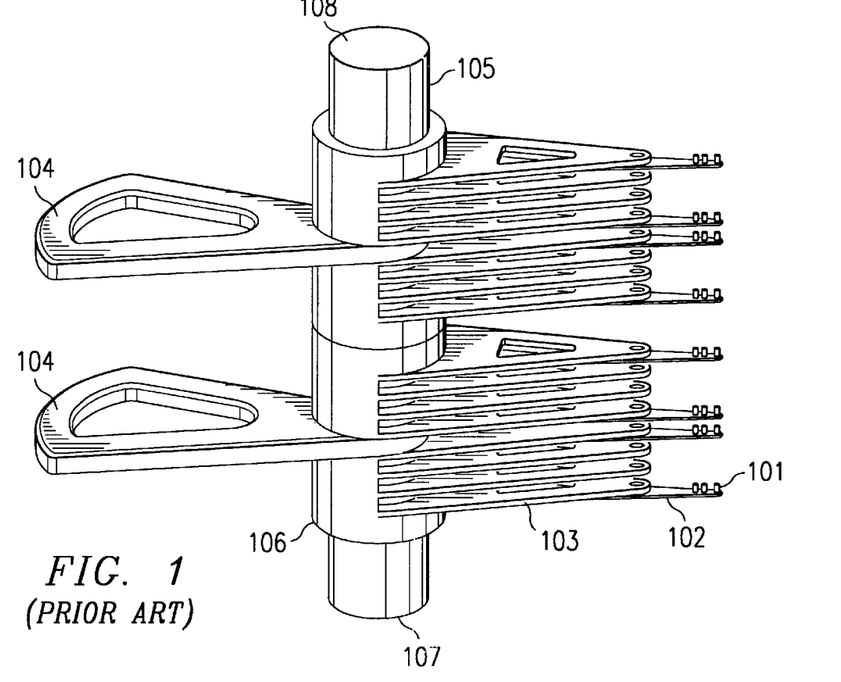
FIG. 1 (Prior Art) shows a view of dual actuators mounted on a common bearing shaft.

FIG. 1 shows a view of two actuators as they would be used in a conventional dual actuator disk drive. More than two actuators are possible however dual actuators are illustrated here. A slider 101 which has a recording head is attached to a suspension 102. The suspension is attached to an arm 103 of the actuator. The other end of the actuator contains coils 104 which form part of the VCM. There are two VCMs, one for each actuator. The two actuators are both mounted on a common bearing shaft 105 and can be rotated independently about the axis defined by the bearing shaft. One end of the bearing shaft 107 is attached to the base of the disk drive. The other end of the bearing shaft 108 is attached to the top or lid of the disk drive. It is also possible to leave the other end of the bearing shaft 108 unattached wherein the bearing shaft is mounted as a cantilever. There are magnet mounting plates (not shown in FIG. 1) which support the magnets for the VCM. The VCM comprises the coils 104 on the actuator and the magnets. An actuator is defined as the mechanical part that has an arm 103 on one end, coils 104 on the other end, and a central portion 106 which can be rotatably attached to a bearing shaft. The actuator may or may not have attached suspensions 102, however to be operable in a disk drive suspensions and heads must be present.

Figure 2:
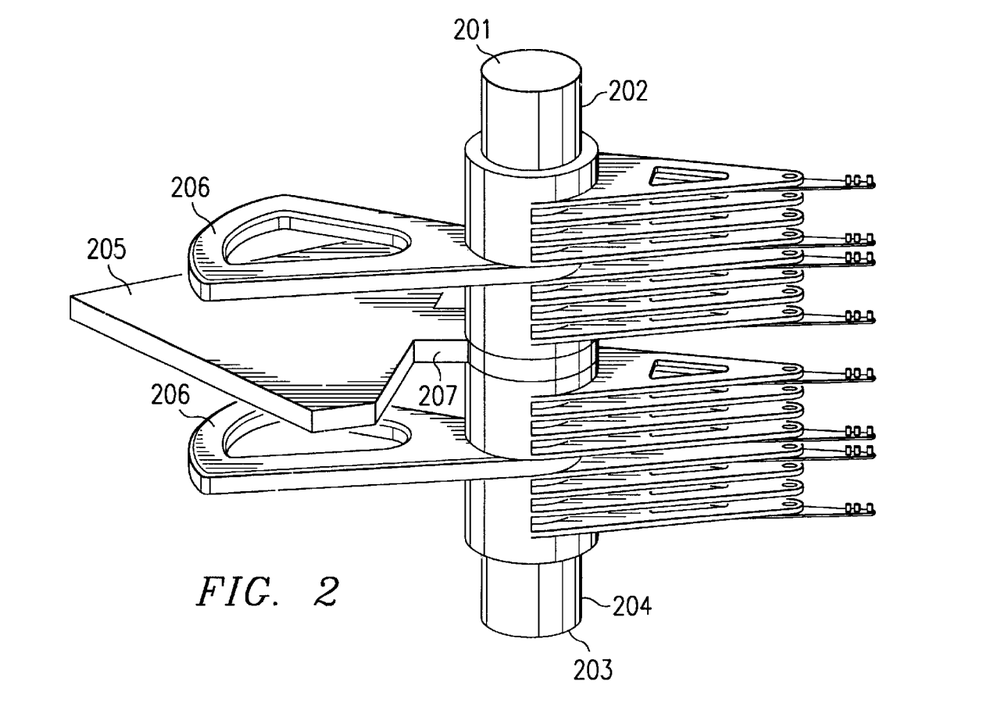
FIG. 2 shows a view of dual actuators according to the present invention. The extension or attachment portion supporting the two bearing shafts from the center plate holding the VCM magnets is shown.

FIG. 2 shows a view of one version of the present invention. In this case the actuator is substantially the same as in FIG. 1. However the common bearing shaft has been replaced by two separate bearing shafts which have a common axis. The upper end 201 of the upper bearing shaft 202 is attached to the top of the disk drive as before. The lower end 203 of the lower bearing shaft 204 is attached to the base of the disk drive. There is a central mounting plate 205 between the coils 206 of the actuators which can hold some of the magnets for the voice coil motor. There is an extension or attachment portion 207 on this mounting plate 205 to which the lower end of the upper bearing shaft 202 and the upper end of the lower bearing shaft 203 is attached.

Figure 3:
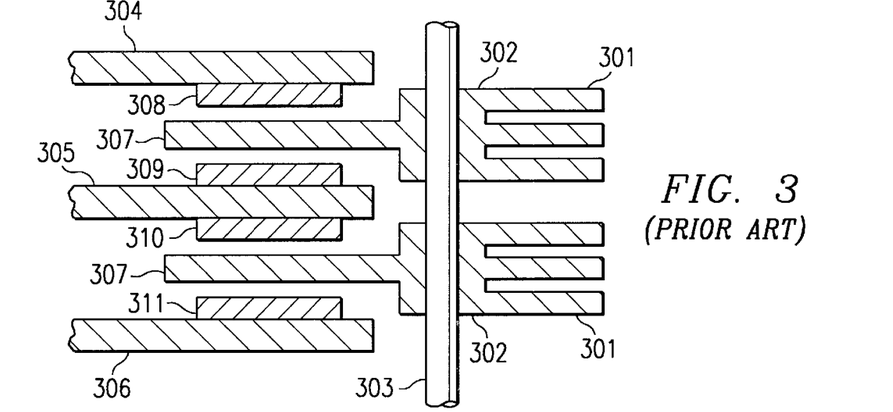
FIG. 3 (Prior Art) shows a schematic cross section of dual actuators on a common bearing shaft.

A schematic cross sectional view of the prior art FIG. 3 will help to clarify the geometrical layout of actuators. The arms 301 of the actuators are shown without attached suspensions in this case. The central portion of the actuator 302 is shown relative to the common central bearing shaft 303. The coils 307 of the actuators are shown opposite from the arms 301 and positioned between the upper 304, central 305 and lower 306 magnet mounting plates. Magnets 308, 309, 310, 311 are shown supported on the mounting plates. This particular example shows magnets on both sides of the coils. The main conduit of mechanical vibrations from one actuator to the other is through the common bearing shaft.

Figure 4:
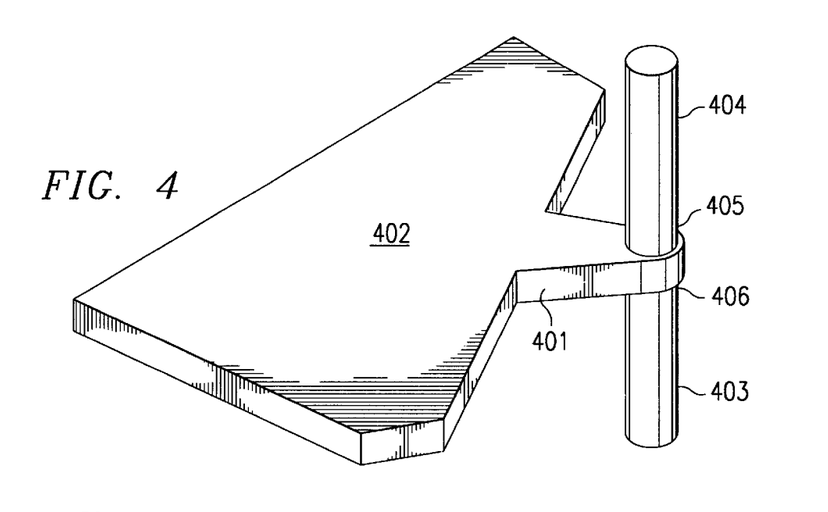
FIG. 4 shows a view of the center plate extension or attachment portion supporting the two bearing shafts.

FIG. 4 shows a view of the extension or attachment portion 401 of the central magnet support plate 402. This attachment portion allows the use of two separate bearing shafts 403, 404 which are mounted along a common axis. The lower end 405 of the upper shaft 404 and the upper end 406 of the lower shaft 403 are both mounted to the attachment portion 401 of the central mounting plate 402.

Figure 5:
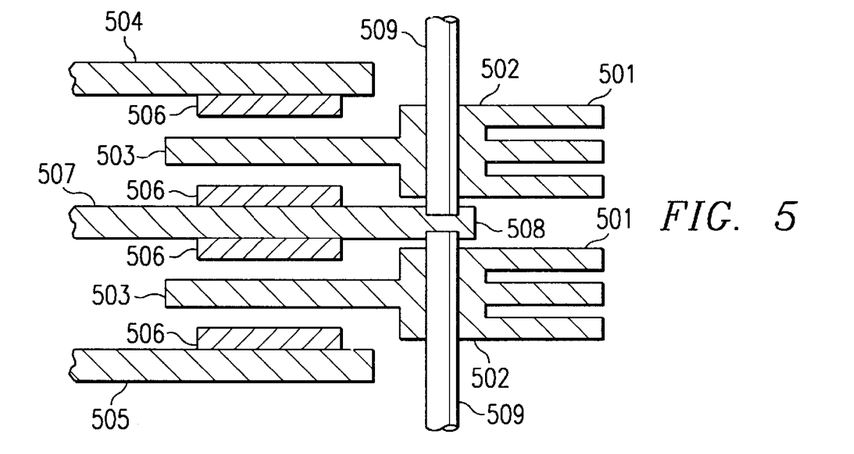
FIG. 5 shows a schematic cross section of the present invention using a solid extension or attachment portion as the center mounting plate.

A cross section of a preferred embodiment of the present invention is shown in FIG. 5. The arms 501, central portion 502, coils 503 of the actuators and the upper 504 and lower 505 magnet mounting plates are shown. The magnets 506 are disposed on the upper 504, central 507, and lower 505 plates. The central mounting plate 507 has an attachment portion 508. This attachment portion 508 allows two separate bearing shafts 508, 509 to be used. The configuration shown in FIG. 5 significantly reduces the induced vibrational coupling in one actuator generated by the motion of the other actuator. Analysis has shown that the baseline coupling is reduced by 10 dB and the modal gain for frequencies above 8 kHz is reduced by 5 to 10 dB compared to the prior art configuration. Baseline coupling is primarily an indication of low frequency interactions from one actuator to another whereas modal gain is used to quantify the vibrational interaction at higher frequencies.

Figure 6:
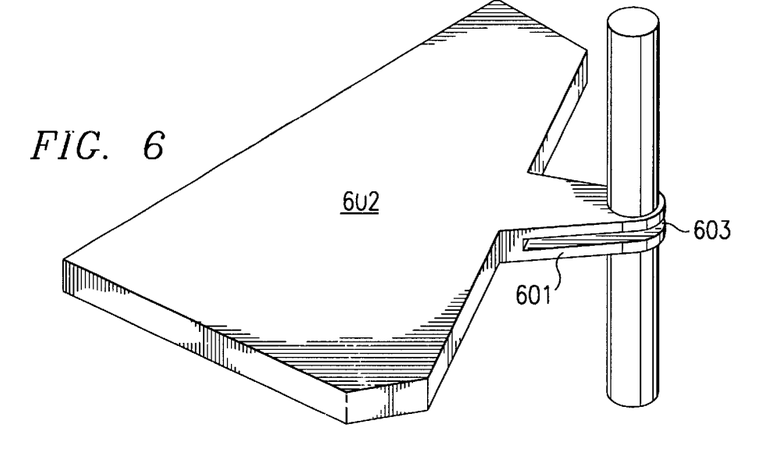
FIG. 6 shows a view of the center plate attachment portion supporting the two bearing shafts wherein the attachment portion is split.
Figure 7:
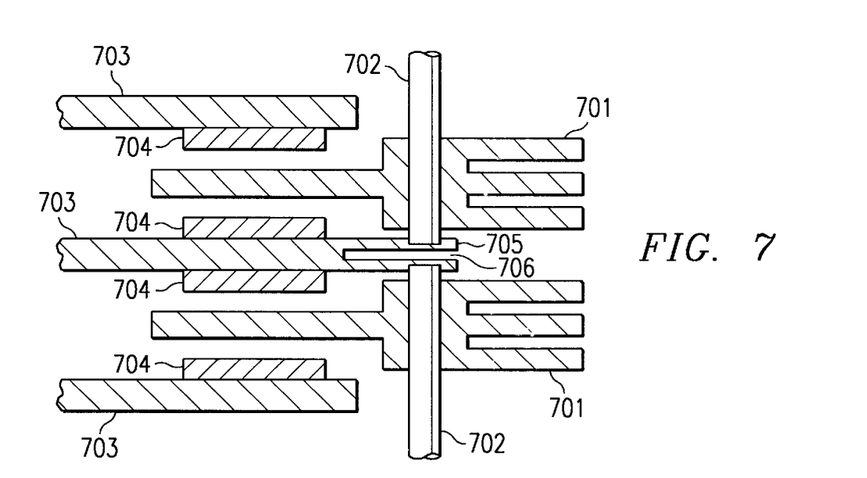
FIG. 7 shows a schematic cross section of the present invention using a split attachment portion to the center mounting plate.

Another preferred embodiment of the present invention is shown in FIG. 6. In this case the attachment portion 601 of the central mounting plate 602 has a slot 603 to increase the vibrational isolation between actuators. A cross sectional view of this embodiment is shown in FIG. 7. As is similar to the first embodiment, the actuators 701 are disposed about the two separate bearing shafts 702. The mounting plates 703 and magnets 704 are similar as described above. The attachment portion 705 of the central mounting plate has a slot 706 in this case. Analysis has shown an improvement in vibrational isolation. Compared to the prior art, the overall baseline was reduced by 20 dB and the modal gain above 6 kHz was reduced by 10 to 20 dB.

Figure 8:
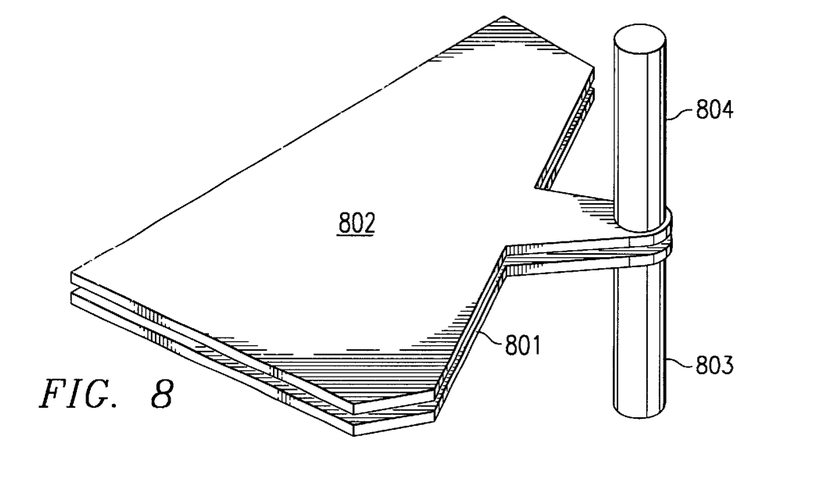
FIG. 8 shows a view of the center plates and attachment portions supporting the two bearing shafts wherein the two center plates are distinct from each other.
Figure 9:
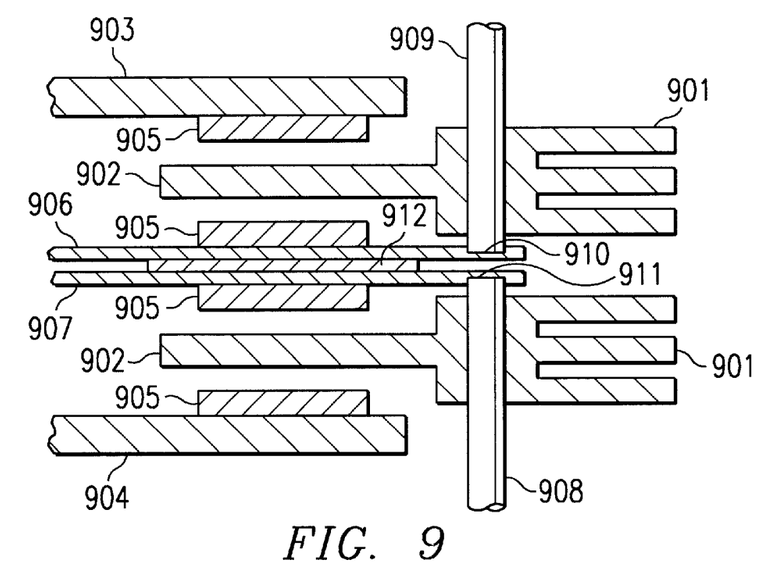
FIG. 9 shows a schematic cross section of the present invention using two separate plates with attachment portions supporting the two bearing shafts.

Another embodiment is shown in FIG. 8. In this case the central magnet support plate is replaced by two separate plates 801, 802. The attachment portion of the upper central plate 802 supports the bottom end of the upper bearing shaft 804 and the attachment portion of the lower central plate 801 supports the upper end of the lower bearing shaft. A cross sectional view of this embodiment is shown in FIG. 9. The arms 901 and coils 902 of the actuators are the same as in the previous discussion. Also the upper magnet mounting plate 903, the lower mounting plate 904 and the magnets 905 are the same as the previous discussion. In this embodiment there are two central plates each of which has an attachment portion. The attachment portion of the upper central mounting plate 906 supports the lower end 910 of the upper bearing shaft 909. The attachment portion of the lower central mounting plate 907 supports the upper end 911 of the lower bearing shaft 908. The improvement in vibration isolation between the two actuators was excellent in this embodiment. The baseline reduction was 40 dB and the modal gain reduction was between 10 and 50 dB depending frequency. In addition to the embodiment of using two separate central magnet mounting plates shown in FIG. 9, it is also possible to use a damping layer of flexible material 912 between the two central plates. This additional damping layer is considered optional because the benefit derived from it is mild compared to using two separate central magnet mounting plates.

Figure 10A:
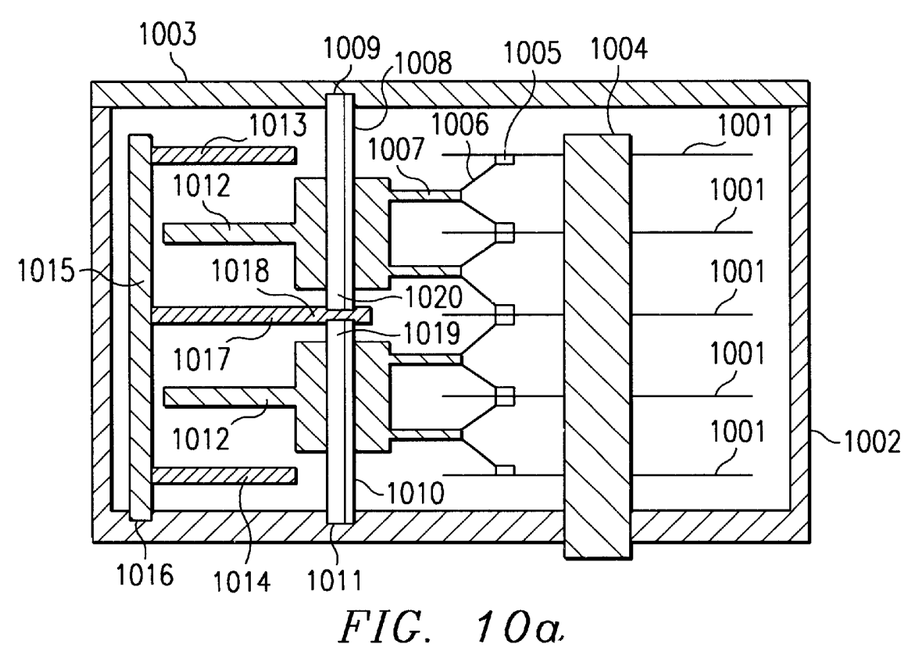
FIGS. 10a and 10b show a schematic cross section of disk drives using the present invention.

FIG. 10a shows a view of the present invention in a complete disk drive. Disks 1001 are mounted on a spindle shaft 1004. There is a spindle motor (not shown) usually attatched to the base casting 1002 which rotates the spindle shaft and the disks. The base casting is sometimes also called the base plate. Each slider 1005 with recording head is connected to a suspension 1006 which in turn is attached to an arm 1007 of the suspension. The magnet mounting plates of the VCM comprise an upper plate 1013, a central plate 1017, and a bottom plate 1014. According to the specific embodiment the central plate may be a solid plate as in FIG. 5, a slotted or split plate as in FIG. 7, or a pair of central plates as in FIG. 9. The mounting plates have a support structure 1015 which is typically attached 1016 to the base casting of the disk drive. VCM magnets (not shown) are attached to the magnet mounting plates. The coils of the actuators 1012 are disposed between the magnets on the mounting plates. The central magnet mounting plate 1018 has an attachment portion 1018. The upper end 1009 of the upper bearing shaft is typically attached to the top plate or lid 1003 of the disk drive, but may however be cantilevered from the lower end. The lower end 1020 of the upper bearing shaft is attached to the attachment portion of the central magnet mounting plate 1018. The upper end 1019 of the lower bearing shaft 1010 is attached to the attachment portion 1018 of the cental magnet mounting plate 1017. The lower end 1011 of the lower bearing shaft 1010 is typically attached to the base casting of the disk drive 1002. The two bearing shafts 1008, 1010 are mounted along a common geometrical axis.

Figure 10B:
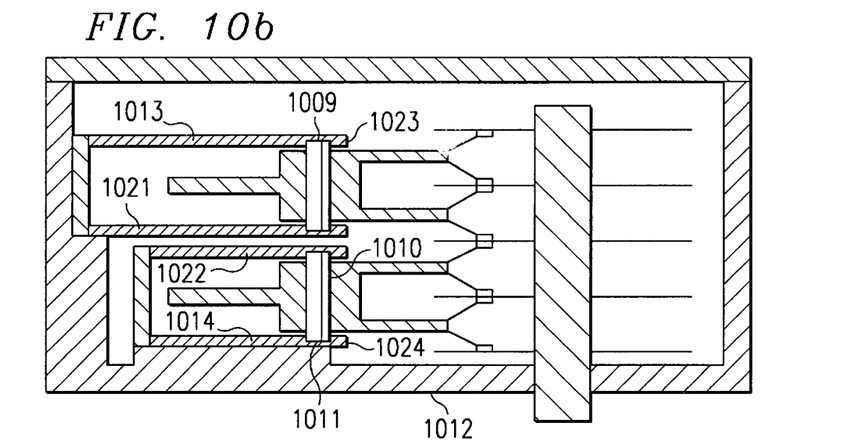

FIG. 10b shows an alternate version of the disk drive. In FIG. 10b the central magnet mounting plate (1017 in FIG. 10a) is shown as two independent mounting plates 1021, 1022. The upper magnet mounting plate 1013 has an attachment portion which allows the upper end of the upper bearing shaft 1009 to be attached to the attachment portion of the upper mounting plate 1023. The lower magnet mounting plate also has an attachment portion 1024 which allows the lower end 1011 of the lower bearing shaft 1010 to be mounted on the attachment portion 1024. The advantage of the approach in FIG. 10b is that each actuator may be assembled independently and mounted separately in the disk drive. Note that each actuator in FIG. 10b is mounted directly on the base casting 1012 and independent of each other. In FIG. 10b the two bearing shafts 1008 and 1010 are mounted along a common geometrical axis.

Figure 11:
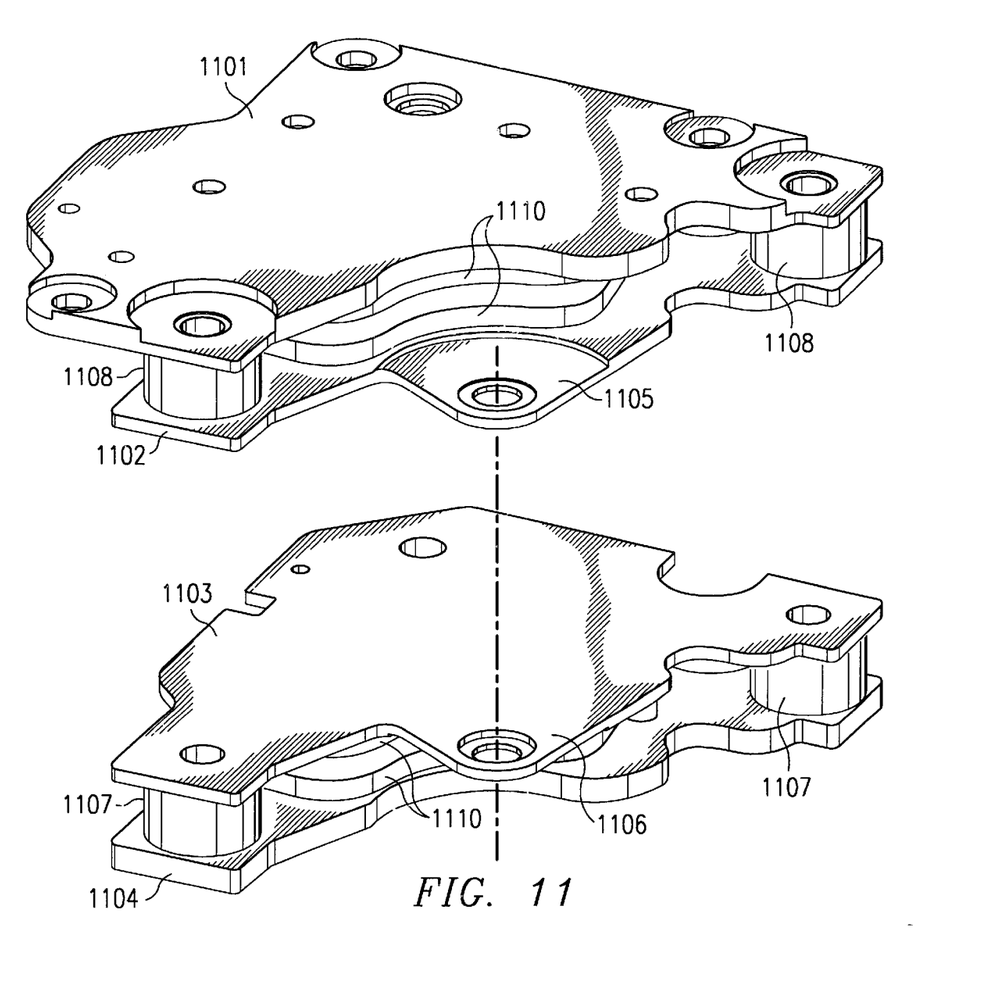
FIG. 11 illustrates a detailed view of one instantiation of two central plates in the VCM with attachment portions to support the two bearing shafts.

FIG. 11 shows a specific example of the magnet mounting plates and the magnets for an implementation with two separate central plates. The upper magnet mounting plate 1101 and lower magnet mounting plate 1104 is shown. The central magnet support plates 1102, 1103 each have attachment portions 1105, 1106. Magnets 1110 are disposed on the magnet mounting plates. The mounting plates have support structures 1107.

Figure 12:
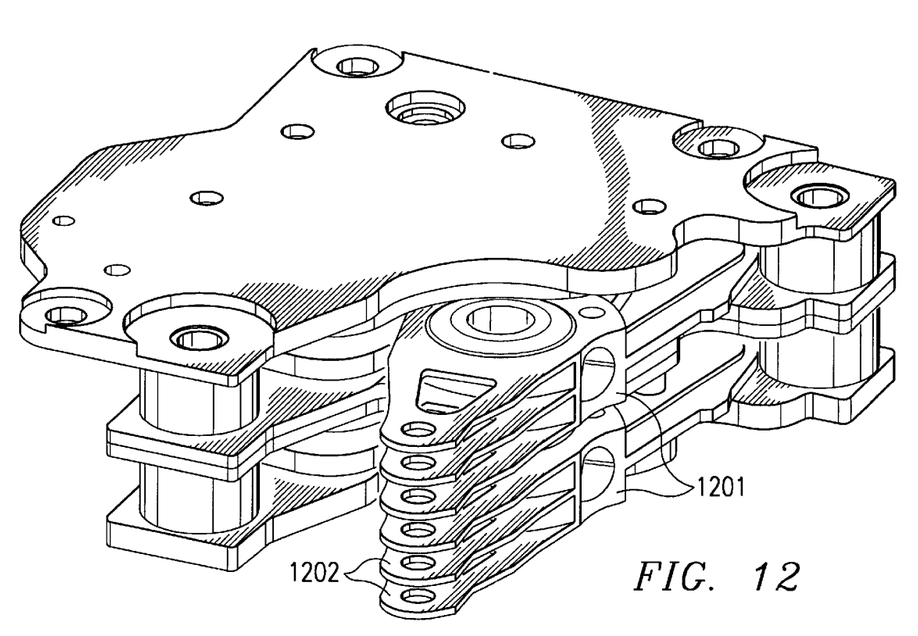
FIG. 12 shows a detailed view of one instantiation of an assembled VCM with actuators.

FIG. 12 shows the assembly which was described in FIG. 11 with the actuators 1201 in place. The arms 1202 of the actuators are illustrated, also the coils of the actuators are disposed between the magnets.

Figure 13:
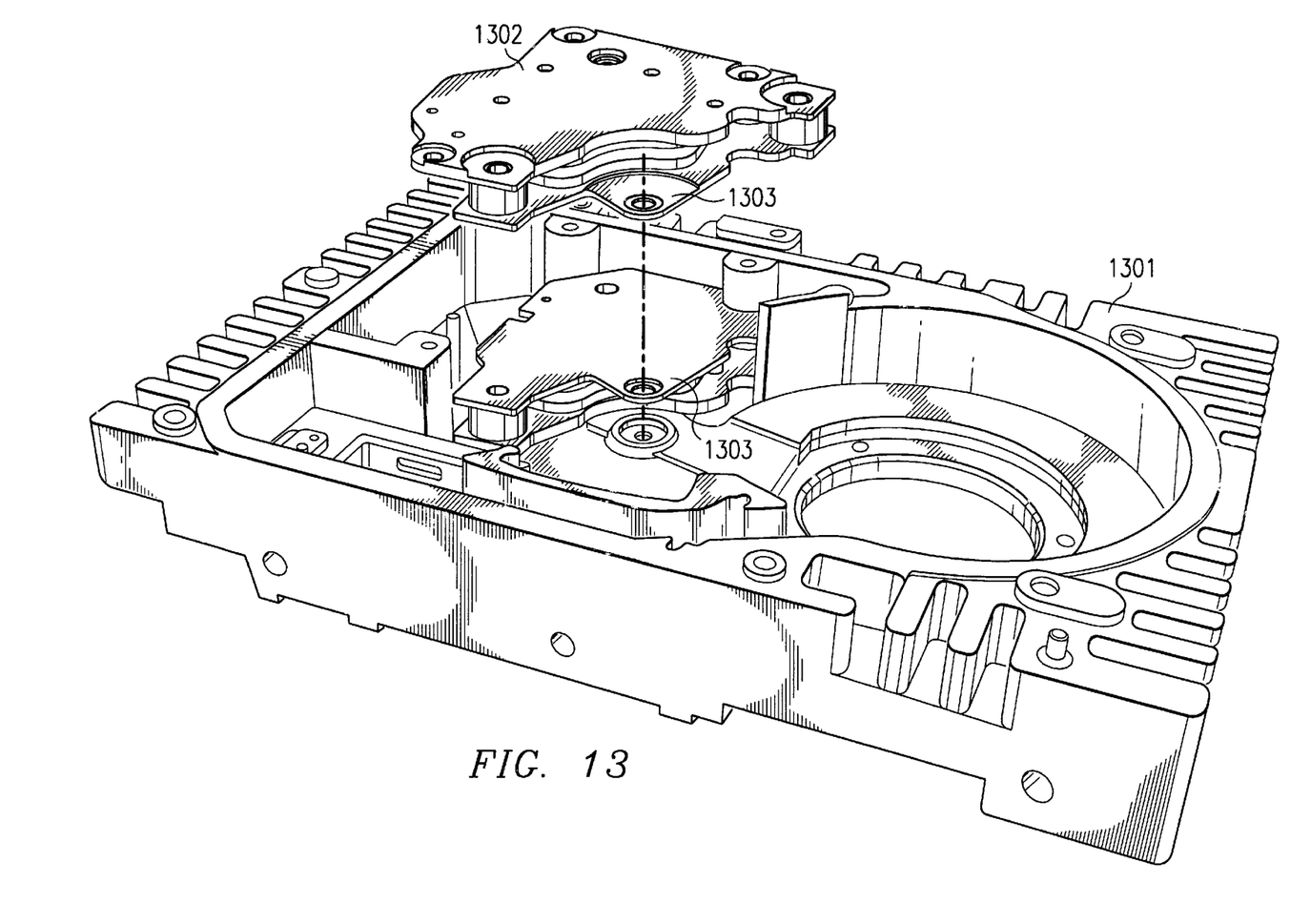
FIG. 13 shows a detailed view showing the center plate attachment portions in a disk drive housing.

FIG. 13 shows the magnet mounting plates described in FIG. 11 and FIG. 12 in relation to the base casting 1301 of the disk drive. The upper magnet mounting plate 1302 and the attachment portions 1303 of the central mounting plates are illustrated.

Figure 14:
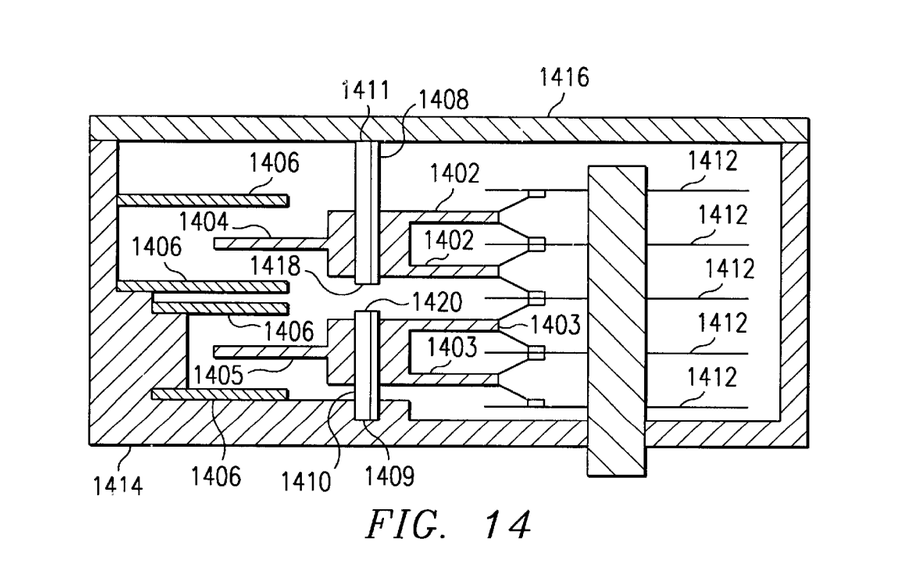
FIG. 14 shows a schematic view of an embodiment wherein the bearing shafts are mounted independently from the magnet mounting plates.

Another embodiment is shown in FIG. 14. In FIG. 14 there is an upper actuator with a coil 1404 and rigid arms 1402. The upper actuator rotates about the bearing shaft 1408. The lower actuator has a coil 1405 and rigid arms 1403 and rotates about the lower bearing shaft 1410. Neither bearing shaft is attached to any of the magnet mounting plates 1406. Instead, the lower end 1409 of the lower bearing shaft 1410 is attached to the base plate 1414 of the disk drive. The upper end 1411 of the upper bearing shaft 1408 is mounted to the top of the disk drive 1416 or alternatively to another support member of the mounting plate. The lower end of the upper bearing shaft 1418 and the upper end of the lower bearing shaft 1420 can be left free so that the two bearing shafts 1408, 1410 are cantilevered, or alternatively the two ends 1418, 1420 may be attached to an additional support of the mounting plate.

Figure 15:
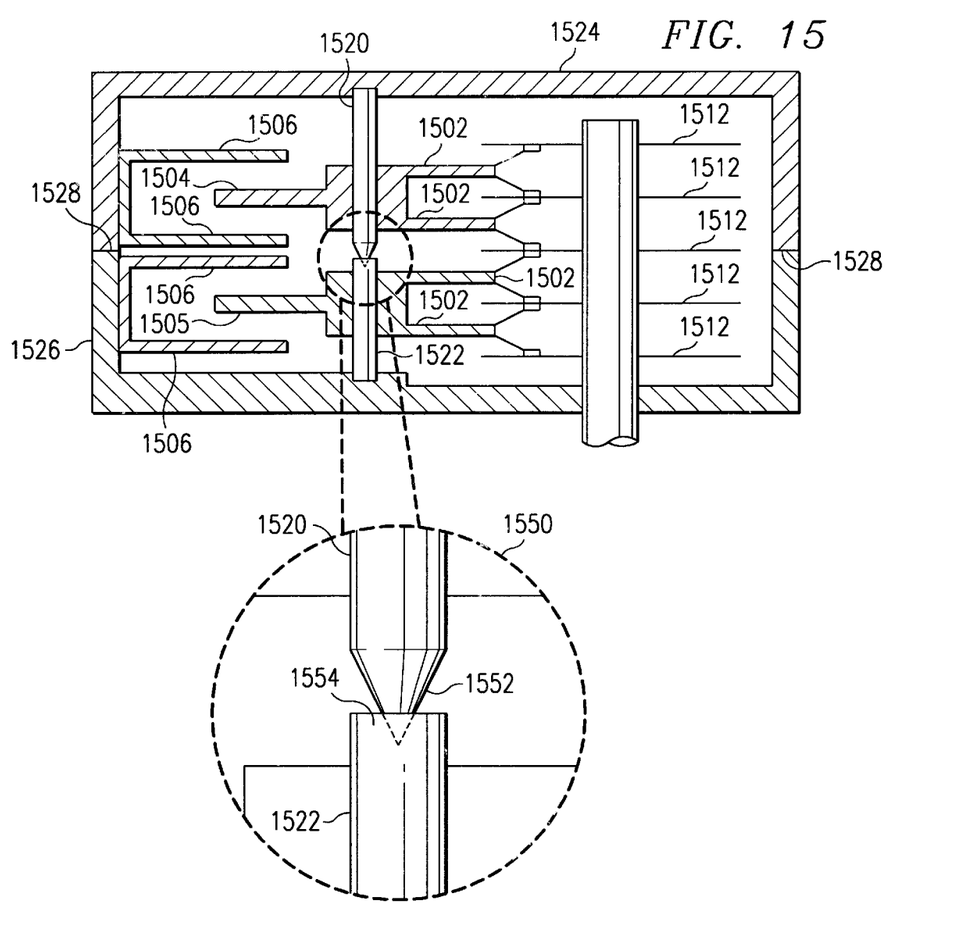
FIG. 15 shows a view of an embodiment wherein the bearing shafts are mounted in a cantilevered fashion on two separate base casting portions.

Another embodiment is shown in FIG. 15. In this case there is an upper bearing shaft 1520 and a lower bearing shaft 1522. In this embodiment the base casting of the disk drive is in two separate members. Having two separate base castings which are subsequently joined together is sometimes called a clamshell design. There is an upper base casting 1524 and a lower base casting 1526. The upper bearing shaft 1520 is mounted in a cantileveled fashion to the upper base plate 1524. The lower bearing shaft 1522 is mounted in a cantilevered fashion to the lower base casting 1526. The upper 1524 and lower 1526 base castings are joined together 1528. For additional mechanical isolation between the two actuators a gasket formed from a material such as a viscoeleastic dampling polymer may be placed between the upper 1524 and lower 1526 base casting. It is also possible to form an optional alignment mechanism at the free ends of the cantilevered bearing shafts. One view of this optional feature is shown in the insert 1550 in FIG. 15. The bottom end 1552 of the upper bearing shaft has a small cone feature which fits an inverted cone feature in the upper end 1554 of the bottom bearing shaft. The matching cones insure that the upper 1520 and lower 1522 bearing shafts are substantially aligned along a common axis. If the alignment mechanism is sufficiently small to minimize mechanical loading, then there will not be any significant vibrations communicated through it. The other components of the disk drive include the disks 1512, the arms of the actuator 1502, the coil portions 1504 of the actuator, and the magnet mounting plates 1506.

Figure 16A:
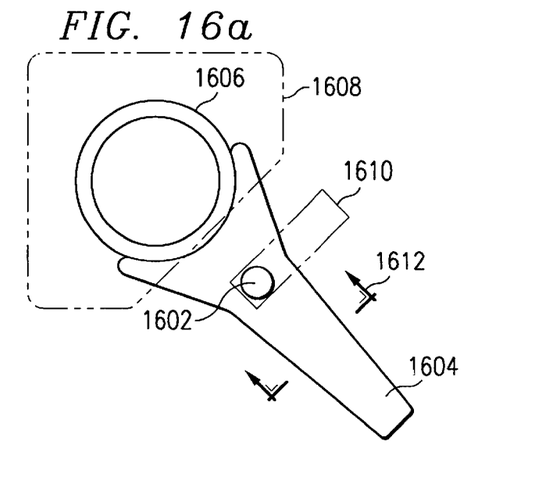
FIG. 16a shows a top down view of the present invention wherein the bearing shafts are mounted on a support member separate from the magnet mounting plates.
Figure 16B:
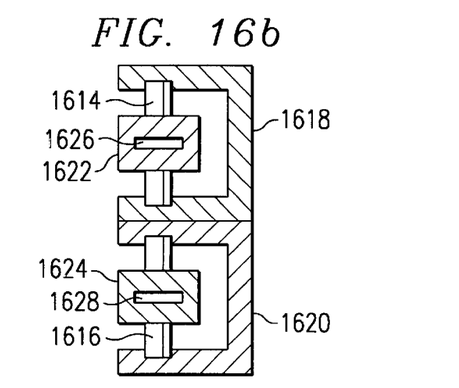
FIG. 16b shows an end-on view of the present invention wherein the bearing shafts are mounted on a support member separate from the magnet mounting plates.

The most convienient method of attaching the ends of both of the bearing shafts is to form an extention on the magnet mounting plates. However it is also possible to mount the bearing shafts using a separate comb structure as is shown in FIGS. 16a and b. Refering to the top down view in FIG. 16a, the pivot point established by the bearing shaft is shown 1602. The arm 1604 and the coil 1606 of the top actuator is shown. The dotted line 1608 shows the location of the magnet mounting plate. There is no extension of the magnet mounting plate in this embodiment. Instead there is a comb structure which is used for mounting the bearing shafts. The dotted line 1610 shows the location of the comb structure. The end-on view 1612 of the bearing shafts in the comb structure is shown in FIG. 16b. The upper bearing shaft 1614 and the lower bearing shaft 1616 are shown mounted in two portions 1618 and 1620 of the comb structure. A portion of the upper actuator 1622 and a portion of the lower actuator 1624 are shown. Also the end of the arms 1626 and 1628 are shown. This is an embodiment illustrating the present invention using a separate mechanism for mounting the multiple bearing shafts.

It should be understood that the invention is not limited to the specific embodiments and examples described above and that many changes and modifications can be made without departing from the scope of the invention as defined in the claims.

We claim:

1. A disk drive, comprising:
   a plurality of disks;
   a plurality of head gimbal assemblies, each head gimbal assembly comprising a suspension, a slider attached to said suspension, a recording head attached to said slider said recording head for recording information on one of said disks;
   an upper and lower actuator, each of said actuators having one or more arms wherein each of said arms is attached to at least one of said head gimbal assemblies; and,
   an upper and lower bearing shaft each having two ends, said upper actuator rotatably mounted on said upper bearing shaft, said lower actuator rotatably mounted on said lower bearing shaft, wherein said upper and said lower bearing shafts are substantially aligned along the same rotational axis, wherein said disk drive additionally includes a central magnet mounting plate wherein the central mounting plate has an attachment portion, said upper bearing shaft has one of said ends attached to said attachment portion of said central magnet mounting plate, and lower bearing shaft has one of said ends attached to said attachment portion of said central magnet mounting plate.

2. A disk drive as in claim 1 wherein said central magnet mounting plate is slotted.

3. A disk drive, comprising:

a plurality of disks;

a plurality of head gimbal assemblies, each head gimbal assembly comprising a suspension, a slider attached to said suspension, a recording head attached to said slider said recording head for recording information on one of said disks;

an upper and lower actuator, each of said actuators having one or more arms wherein each of said arms is attached to at least one of said head gimbal assemblies; and, an upper and lower bearing shaft each having two ends, said upper actuator rotatably mounted on said upper bearing shaft, said lower actuator rotatably mounted on said lower bearing shaft, wherein said upper and said lower bearing shafts are substantially aligned along the same rotational axis said disk drive additionally including an upper, a lower, an upper central, and a lower central magnet mounting plate wherein each of said central mounting plates has an attachment portion;

wherein said upper bearing shaft has one of said ends attached to said attachment portion of said upper central magnet mounting plate, and lower bearing shaft has one of said ends attached to said attachment portion of said lower central magnet mounting plate.

4. A disk drive as in claim 3 wherein damping material is placed between said upper central and said lower central magnet mounting plates.

* * * * *